United States Patent [19]

Takahashi et al.

[11] Patent Number: 4,763,708
[45] Date of Patent: Aug. 16, 1988

[54] PNEUMATIC TIRE

[75] Inventors: Fumio Takahashi, Kodaira; Nobuya Yoshimura, Tokorozawa, both of Japan

[73] Assignee: Bridgestone Corporation, Tokyo, Japan

[21] Appl. No.: 14,186

[22] Filed: Feb. 11, 1987

Related U.S. Application Data

[63] Continuation of Ser. No. 828,127, Feb. 11, 1986, abandoned.

[30] Foreign Application Priority Data

Feb. 20, 1985 [JP] Japan .................................. 60-30217

[51] Int. Cl.$^4$ .............................................. B60C 3/06
[52] U.S. Cl. .................. 152/209 A; 152/456
[58] Field of Search ........... 152/454, 455, 456, 209 R, 152/209 A, 209 D

[56] References Cited

U.S. PATENT DOCUMENTS

| Re. 26,713 | 11/1969 | Mirtain et al. ............ | 152/455 |
| 3,155,135 | 11/1964 | Klenk ..................... | 152/209 R |
| 3,162,229 | 12/1964 | Ellenrieder et al. ...... | 152/209 A |
| 3,286,756 | 11/1966 | Ellenrieder et al. ...... | 152/209 A |
| 3,410,329 | 11/1968 | Betzbatchenko ......... | 152/209 A |
| 3,435,874 | 4/1969 | Mirtain et al. ............ | 152/352 |
| 3,554,259 | 1/1971 | Webb ..................... | 152/209 A |
| 3,765,468 | 10/1973 | Verdier ................... | 152/209 A |
| 4,044,810 | 8/1977 | Taniguchi et al. ........ | 152/454 |
| 4,155,392 | 5/1979 | Duderstadt et al. ...... | 152/209 R |
| 4,258,776 | 3/1981 | Walters et al. .......... | 152/209 R |
| 4,262,721 | 4/1981 | Tadokoro et al. ........ | 152/209 R |
| 4,442,879 | 4/1984 | Uemura ................... | 152/209 R |

FOREIGN PATENT DOCUMENTS

| 1680394 | 9/1971 | Fed. Rep. of Germany . | |
| 2343747 | 6/1975 | Fed. Rep. of Germany ... | 152/209 R |
| 57-47901 | 9/1982 | Japan ..................... | 152/209 D |
| 59-59505 | 4/1984 | Japan ..................... | 152/209 R |

Primary Examiner—Michael Ball
Assistant Examiner—Ramon R. Hoch
Attorney, Agent, or Firm—Sughrue, Mion, Zinn, Macpeak & Seas

[57] ABSTRACT

A pneumatic radial tire wherein with respect to a central plane of a wheel in a transversely sectional plane containing a rotary axis of the tire, a carcass and a reinforcing belt layer have respectively symmetrical contour profiles and a tread portion has an asymmetrical contour profile. The contour of the tread within the transverse sectional plane satisfies the following relations:

the maximum outer diameter point is positioned at a place axially apart from the central plane of the wheel and a distance between the maximum outer diameter point and the central plane of the wheel is not less than 1/10 times the maximum width of the tire;

when contours of portions of the tread located on opposite sides of the maximum outer diameter point are approximated by respectively two arches, the radius of curvature, $R_2$, of the narrower section is larger than the radius of curvature, $R_3$, of the wider section and both the arches have a common tangent at the maximum outer diameter point; and the following relation exists among the radii of the curvatures, $R_2$ and $R_3$ and the maximum outer diameter D.

$$0 \leq R_2 - R_3 \leq D/5$$

4 Claims, 2 Drawing Sheets

FIG._1
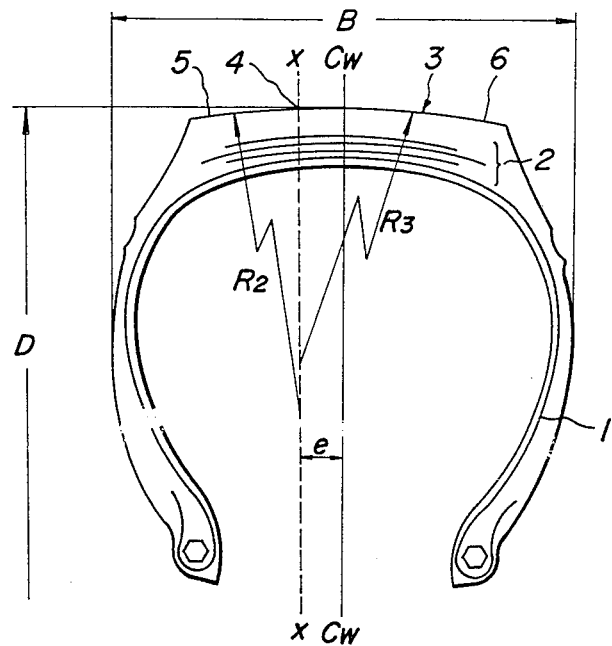
FIG._2
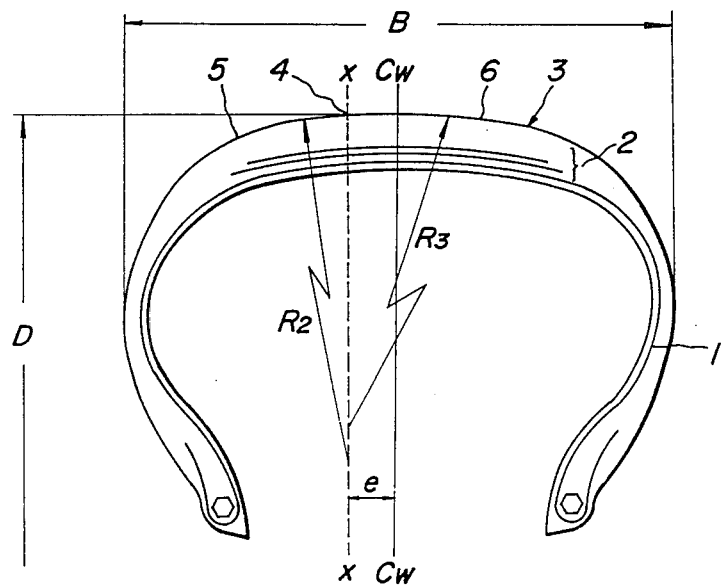

FIG_3a
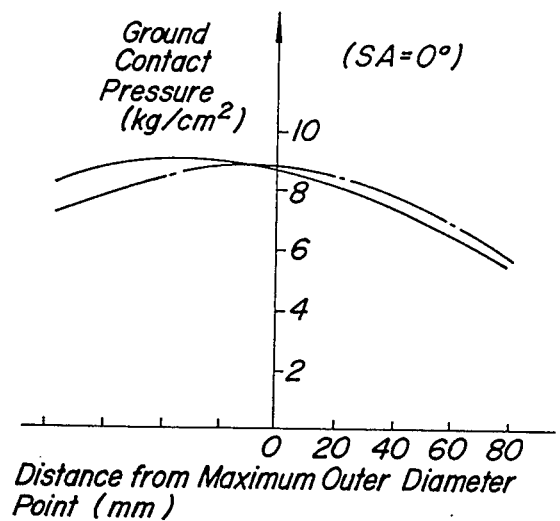
FIG_3b
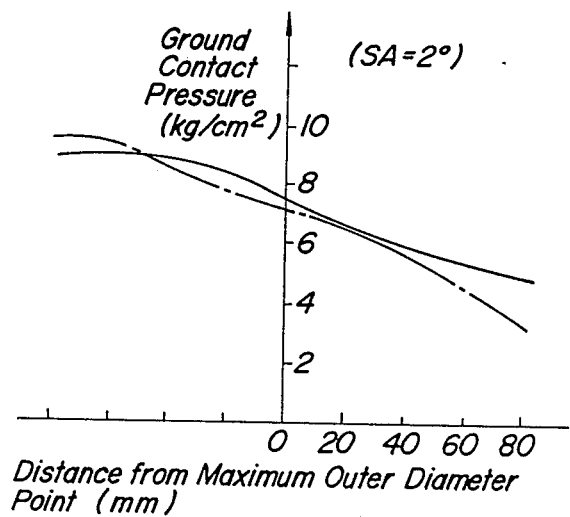

PNEUMATIC TIRE

This is a continuation of Ser. No. 828,127, filed on Feb. 11, 1986, now abandoned.

BACKGROUND OF THE INVENTION

1. Field of the Invention

The present invention relates to a pneumatic radial tire, and more particularly the invention relates to an improvement on the contour profile of a tread portion in an asymmetric radial tire.

2. Related Art Statement

It is well known that uneven wear is frequently produced at one side edge portion of a tread than at the other side edge portion under various conditions such as vehicle wheel alignment, transverse gradient of roads, tread base present in vehicle right and left wheels, etc. For instance, when the wheel alignment is set at toe-in, the outer side of the tread is more likely to be worn, while when the wheel alignment is set at toe-out, the inner side of the tread is more likely to be worn. In the case that a road has a gradient transversely inclined towards its shoulder portion, the tread edge portion on the side of the road shoulder portion is likely to be locally worn out. It has been recognized that uneven wear at the tread side portion of the tread may be effectively restrained by increasing the gound contact pressure of the edge portion of the tread on the side which is more likely to be locally worn and restraining slip at this tread edge.

In contrast to ordinary tires having a symmetrical tread contour profile with respect to the tire maximum outer diameter portion, that is, the equatorial plane, there have been proposed and actually used tires having an asymmetrical tread contour profile on the basis of the above recognition. Such conventional asymmetrical tires are so constituted that the equatorial plane is made coincident with the central plane of a wheel, and the radius of curvature of the tread portion is varied between the opposite sides of the equatorial plane, while the centers of the curvatures are positioned in the wheel central plane.

(Problems to be solved by the Present Invention)

As evident from the above, the asymmetrical measure of the tread contour profile is intended to restrain uneven wear by appropriately controling various characteristics such as ground contact pressure, shearing force, etc. within the tire ground contact plane. Therefore, when the ununiformity of the ground contact pressure on the opposite edge portions of a tire ground contact plane in the tire transverse direction, that is, at the shoulder portions, as particularly representative characteristics, is increased, the difference in radius of curvature between the opposite edge portions of the equatorial plane must be increased according to conventional asymmetrical tires. On the other hand, a certain minimum value thickness of rubber of the tread portion must be assured from the standpoint of wear-proof life. Consequently, the volume of the tread is increased, which adversely affects the cost. When controlling factors of the distribution in the ground contact pressure are examined, the maximum outer diameter portion of the tire is positioned in the equatorial plane in the case of the conventional asymmetrical shape. Therefore, the ground contact pressure is maximum at the equator. Thus, an amount by which the ground contact pressure-high portion shifts from the equatorial plane toward the tread edge portion by a lateral force applied to the tire when a vehicle is turning is large. The ground contact pressure at the edge portion of the tread increases due to the vehicle turning to make a share of the lateral force loaded upon the tread edge portion excessive. Thus, it is difficult to effectively restrain wearing of the shoulder portions.

SUMMARY OF THE INVENTION

It is an object of the present invention to eliminate the above-mentioned problems.

More specifically, the object of the present invention is to provide an asymmetrical tire which can improve wear resistance at the shoulder portions through effectively restraining increase in the ground contact pressure at the edge portion of the tread to be caused by vehicle-turning while enhancing the ground contact pressure at the tread edge portion without increasing the volume of the tread.

According to the present invention, there is a provision of a pneumatic radial tire wherein with respect to a central plane of a wheel in a transversely sectional plane containing a rotary axis of the tire, a carcass and a reinforcing belt layer have respective symmetrical contour profiles and a tread poriton has an asymmetrical contour profile, and the contour profile of the tread within the transverse sectional plane satisfies the following relations:

the maximum outer diameter point is positioned at a plane axially apart from the central plane of the wheel and a distance between the maximum outer diameter point and the central plane of the wheel is not less than 1/10 times the maximum width of the tire;

when contours of portions of the tread located on opposite sides of the maximum outer diameter point are approximated by respectively two arches, the radius of curvature, $R_2$, of the narrower section is larger than the radius of curvature, $R_3$, of the wider section, and both the arches have a common tangent at the maximum outer diameter point; and the following relation exists among the radii of the curvatures, $R_2$ and $R_3$ and the maximum outer diameter D.

$$0 \leq R_2 - R_3 \leq D/5$$

These and other objects, features and advantages of the present invention will be well appreciated upon reading of the following description of the invention when taken in conjunction with the attached drawings with understanding that some modifications, variations and changes could be easily done by the skilled person in the art to which the invention pertains without departing from the spirit of the invention or the scope of a claim appended hereto.

BRIEF DESCRIPTION OF THE DRAWINGS

For better understanding of the invention, reference is made to the attached drawings, wherein:

FIGS. 1 and 2 are both sectional views of embodiments of the asymmetrical radial tires according to the present invention; and FIGS. 3(a) and 3(b) are graphs showing distribution in the ground contact pressure with respect to the tires of the structures according to the present invention and the prior art, respectively.

DETAILED DESCRIPTION OF THE INVENTION

In order to accomplished the above-mentioned object, the present inventors have first confirmed durign realization of the right and left asymmetry of a tread that uneven wear restraining effect which is equal to or more excellent than that of the conventional asymmetrical tires can be obtained by locating the highest point of the tread contour corresponding to the maximum outer diameter portion of the tire in a place axially apart from the central plane of a wheel, and setting a distance e between the maximum highest point and the central plane of the wheel at not less than 1/10 of the maximum width B of the tire. To the contrary, if the distance between the highest point of the tread contour and the central plane of the wheel is smaller than 1/10 of the tire maximum width, the ground contact pressure can not be effectively made ununiform.

Generally, the tread contours in the opposite sides of the tire maximum outer diameter portion are approximately respresented by respectively two arches, and the tangents at the maximum outer diameter point of these arches are preferably made coincident with each other. That is, if the tangents of the arches are not in coincidence with each other, the maximum outer diameter portion form a ridge so that there is a fear that the tire will meander thereby. When the tangents of both the arches are in coincidence with each other, the centers of the curvatures are positioned on the same straight line which is in parallel with the central plane of the wheel and contains the maximum outer diameter point apart from the central plane of the wheel by the above-mentioned distance ($\geq B/10$).

Assume that $R_2$ and $R_3$ are made corresponding to the narrower tread section and the wider tread section, respectively, as regards radii of the curvature of the arches with two centers of curvatures. Since the one that has a tread edge nearer the maximum outer diameter portion is the tread section having the radius of curvature, $R_2$, it is effective from the standpoint of restraining the wear at the edge portions to make the radius of curvature, $R_2$, larger than the radius of curvature $R_3$. However, if the difference in the radius of the curvature is too large, the tire load during the straight running is applied to the narrower tread section, thereby deteriorating the ground contacting and the steering characteristics. Thus, upon having studied the optimum range of the difference $R_2-R_3$ between the radii of the curvatures with respect to the tire maximum width B, the ration B/e of the tire maximum width B and the distance e between the highest point of the tread and the central plane of the wheel, and the maximum outer diameter D of the tire as parameters, it was empirically confirmed that the following range is preferable.

$$R_2-R_3 \leq (D/50) \times (B/e)$$

As evident from the above, since $R_2-R_3 \geq 0$ and $B/e \leq 10$, the above formula is:

$$0 \leq R_2-R_3 \leq D/5$$

That is, it was made clear that the difference between the radii of the curvatures is set within 1/5 of the maximum outer diameter of the tire.

The present invention has been made on the basis of the above-mentioned concept, and relates to an asymmetrical radial tire in which the contour profile of the tread portion within the transversely sectional plane including the rotational axis of the tire satisfies the following conditions.

The maximum outer diameter point is located at a plane apart sidewisely from the central plane of the wheel, and the distance between the maximum outer diameter point and the central plane of the wheel is not less than 1/10 of the maximum width of the tire;

When the tread sections located on the opposite sides of the maximum outer diameter point are approximated by two arches, the radius of the curvatures, $R_2$, of the narrower tread section is larger than the radius of the curvature, $R_3$, of the wider tread section, and both the arches have a common tangent at the maximum outer diameter point.

And, the following relation exists among the radii of the curvatures, $R_2$ and $R_3$ and the maximum outer diameter D:

$$0 \leq R_2-R_3 \leq D/5$$

The present invention will be explained more in detail with reference to the attached drawings:

FIGS. 1 and 2 show embodiments in which the present invention is applied to a truck or passenger car asymmetrical radial tire. As illustrated in FIG. 1, a truck tire may have 3 belt layers comprising the reinforcing layer. As illustrated in FIG. 2, a passenger car tire may have a pair of belt layers comprising the reinforcing layer. In the tires of both the embodiments, a carcass 1 and a reinforcing layer 2 have symmetrical shapes with respect to a central plane of a wheel, Cw—Cw within a transverse sectional plane containing a rotational axis of the tire. Different from the conventional asymmetrical radial tire in which the tire equatorial plane, that is, the maximum outer diameter point of the tread contour profile, is in conformity with the central plane of the wheel . According to the present invention, the maximum outer diameter point 4 of the tread 3 is located axially apart from the wheel central plane Cw—Cw. The distance e between the maximum outer diameter point 4 and the central plane Cw—Cw of the wheel is set at not less than 1/10 of the maximum width B of the tire. Right and left tread sections 6 and 5 located on the opposite sides of the maximum outer diameter point are designed to have the contour profiles represented by the arches with the respective radii of the curvatures, $R_2$ and $R_3$. The arches have centers of the curvatures located on a common straight line X—X in parallel with the central plane Cw—Cw of the wheel and containing the maximum outer diameter point 4 apart from the central plane Cw—Cw of the wheel by the above-mentioned distance e such that the arches have the common tangent parallel to the rotational axis of the tire at the maximum outer diameter point 4. The radius of curvature $R_2$ of the tread section 5 which is narrower between the tread sections 5 and 6 located on the opposite sides of the maximum outer diameter point 4 and is nearer to the maximum outer diameter point 4 is larger than the radius of the curvature $R_3$ of the wider tread section 6. The difference $R_2-R_3$ between the radii of curvatures, $R_2$ and $R_3$, is set at not more than 1/5 of the maximum outer diameter D of the tire.

The concrete construction of the embodiments of FIGS. 1 and 2 are shown in the following Table.

|  | Example 1 (FIG. 1) | Example 2 (FIG. 2) |
|---|---|---|
| Size (used rim) | TB11R24.5 (8.25-24.5) | PS165SR13 (5J × 13) |
| Radius of curvature, $R_2$ | 680 mm | 350 mm |
| Radius of curvature, $R_3$ | 480 mm | 250 mm |
| Maximum outer diameter D | 1,102 mm | 596 mm |
| Maximum width B | 280 mm | 163 mm |
| Distance e | 28 mm | 16.5 mm |

(Effects)

The asymmetrical radial tire according to the present invention exhibits the following effects as compared with the asymmetrical radial tires of the conventional structure which have the same radii of curvatures and maximum outer diameter as well as the same maximum width except that the equatorial plane of the tire is in conformity with the central plane of the wheel.

First, according to the present invention, since the difference in thickness between the opposite edge portions of the tread can be more enlarged as compared with that in the conventional structure, the initial stage ground contact pressure on the side with a larger radius of the curvature can be increased. Further, since the volume of the tread can be relatively decreased, the cost can be reduced.

In addition, according to the present invention, since the ground contact pressure-high portion is located apart from the central plane of the wheel toward the edge portion of the tread during straight running, the movement of the ground contact pressure-high portion toward the edge portion of the tread when the lateral force is applied from the outside to the inside of the tire during vehicle-turning is small so that the increase in the ground contact pressure at the tread edge portion which is caused by the vehicle-turning can be restrained. Therefore, the lateral force to be held by the tread edge portion can be reduced to enhance the wear resistance of the tread edge portion.

FIGS. 3(a) and 3(b) show results of measurements of distribution in the ground contact pressure in both cases of the asymmetrical radial tire according to the present invention and that of the conventional structure with respect to straight running and turning. The tire size is 11R 24.5 for the trucks and buses in both cases. A solid line and a one-dot-chain line show the ground contact pressure in the tire structure according to the present invention and that of the conventional structure, respectively. It is evident from the measurement results at straight running in FIG. 3(a) that although the ground contact pressure deviates toward the one side edge of the tread in both cases in the tire according to the present invention, effect of increasing the ground contact pressure at one side edge of the tread is larger and effect of restraining the uneven wearing is excellent. Further, it is evident from the measurement results in turning in FIG. 3(b) that the deformation amount of the tread in the straight running in the case of the asymmetrical shape according to the present invention is smaller than in the case of the conventional asymmetrical shape, so that excellent wear resistance can be obtained at the tread edge portions. Moreover, comparative tests on the uneven wearing were performed in mounting on actual vehicle with respect to tires of the conventional structure corresponding to the tires shown in FIGS. 1 and 2. Test was performed while truck and bus tire of a tire size of 11R 24.5 was attached to a truck as a front wheel set at a toe-in of 3 mm in the tire alignment while the maximum outer diameter portion was directed outwardly. The width of uneven wearing in the case of running of 40,000 km on a transversely inclined road was 15 mm in the tire of the conventional structure and 8 mm in the tire according to the present invention. Further, test was performed while the tire of 165 SR 13 for passenger car was mounted onto a passenger car while the tire alignment was at a toe-out of 2 mm and the maximum outer diameter portion was inwardly directed. The width of uneven wear in the inside tread section at 20,000 km running was 6.0 mm in the conventional structure tire and 4.6 mm in the tire according to the present invention. In both of the above tests, it was recognized that the present invention gives more excellent uneven wear restraining effect.

What is claimed is:

1. A pneumatic radial tire wherein with respect to a central plane of the tire in a transversely sectional plane containing a rotary axis of the tire, a carcass and a reinforcing belt layer have respective symmetrical contour profiles and a tread has an asymmetrical contour profile, and the contour profile of the tread within the transverse sectional plane satisfies the following relations:
   the maximum outer diameter point is positioned at a place axially apart from the central plane of the tire and a distance between the maximum outer diameter point and the central plane of the tire is not less than 1/10 times the maximum width of the tire;
   when contours of portions of the trread located on opposite sides of the maximum outer diameter point are approximated by two arches composed of an axially narrower tread section and a wider tread section, the radius of curvature, $R_2$, of the narrower tread section is larger than the radius of curvature, $R_3$, of the wider tread section; and
   the following relation exists among the radii of the curvatures, $R_2$ and $R_3$ and the maximum outer diameter D, $$0 \leq R_2 - R_3 \leq D/5.$$

2. The pneumatic radial tire of claim 1, wherein said tire is a passenger tire, said reinforcing belt layer comprising:
   two belt plies having a symmetrical contour profile with respect to said central plane of a wheel.

3. The pneumatic radial tire of claim 1, wherein said tire is a truck tire, said reinforcing belt layer comprising;
   three belt plies having a symmetrical contour profile with respect to said central plane of said wheel.

4. The radial tire of claim 1, wherein both of said arches have a common tangent point at the maximum outer diameter point.

* * * * *